United States Patent
Saso et al.

(10) Patent No.: US 11,059,444 B2
(45) Date of Patent: Jul. 13, 2021

(54) AIRBAG SYSTEM

(71) Applicant: HONDA MOTOR CO., LTD., Tokyo (JP)

(72) Inventors: Takashi Saso, Wako (JP); Hiroyuki Ito, Wako (JP); Takayuki Shimizu, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 5 days.

(21) Appl. No.: 16/729,607

(22) Filed: Dec. 30, 2019

(65) Prior Publication Data

US 2020/0238937 A1 Jul. 30, 2020

(30) Foreign Application Priority Data

Jan. 29, 2019 (JP) .............................. JP2019-013283

(51) Int. Cl.
| | |
|---|---|
| *B60R 21/203* | (2006.01) |
| *B60R 21/207* | (2006.01) |
| *B60N 2/64* | (2006.01) |
| *B60N 2/20* | (2006.01) |
| *B60N 2/015* | (2006.01) |
| *B60R 21/231* | (2011.01) |
| *B60R 21/00* | (2006.01) |

(52) U.S. Cl.
CPC ............ *B60R 21/203* (2013.01); *B60N 2/015* (2013.01); *B60N 2/20* (2013.01); *B60N 2/643* (2013.01); *B60N 2/646* (2013.01); *B60R 21/207* (2013.01); *B60R 2021/0044* (2013.01); *B60R 2021/23107* (2013.01)

(58) Field of Classification Search
CPC ..... B60R 21/207; B60R 21/203; B60N 2/015; B60N 2/20; B60N 2/646
See application file for complete search history.

(56) References Cited

U.S. PATENT DOCUMENTS

| | | | | |
|---|---|---|---|---|
| 7,571,931 | B2 * | 8/2009 | Watanabe | ............... B60R 21/18 |
| | | | | 280/733 |
| 10,850,650 | B2 * | 12/2020 | Mori | ................... B60N 2/42709 |
| 10,870,405 | B2 * | 12/2020 | Kwon | .................... B60R 21/207 |
| 2019/0016293 | A1 * | 1/2019 | Saso | ..................... B60R 21/207 |
| 2020/0086770 | A1 * | 3/2020 | Huf | ........................ B60N 2/161 |
| 2020/0189505 | A1 * | 6/2020 | Kartenberg | .............. B60N 2/04 |

(Continued)

FOREIGN PATENT DOCUMENTS

| | | | |
|---|---|---|---|
| JP | 10138809 | A * | 5/1998 |
| JP | 2004-291785 | | 10/2004 |

*Primary Examiner* — Faye M Fleming
(74) *Attorney, Agent, or Firm* — Amin, Turocy & Watson LLP (57) ABSTRACT

An airbag system includes a main airbag device that is provided in front of an occupant and that includes a first bag body, a seat airbag device that is provided in the vehicle seat and that includes a second bag body which is configured to be deployed by being inflated toward at least sides and a front of a torso of the occupant at behind the first bag body and which is configured to restrict the occupant to the vehicle seat, and a seat displacement mechanism that is configured to release restriction by a lock section that restricts movement of the vehicle seat and that is configured to displace the occupant toward the first bag body in front in a case an input impact is equal to or larger than a predetermined strength.

5 Claims, 9 Drawing Sheets

(56) References Cited

U.S. PATENT DOCUMENTS

2020/0189514 A1\* 6/2020 Yoo .................... B60R 21/23138
2020/0238941 A1\* 7/2020 Saso ...................... B60R 21/207
2020/0290547 A1\* 9/2020 Shimizu ............ B60R 21/01552
2020/0290548 A1\* 9/2020 Kokeguchi ....... B60R 21/23138
2020/0290552 A1\* 9/2020 Saso ....................... B60R 21/21

\* cited by examiner

AIRBAG SYSTEM

CROSS-REFERENCE TO RELATED APPLICATION

Priority is claimed on Japanese Patent Application No. 2019-013283, filed Jan. 29, 2019, the content of which is incorporated herein by reference.

BACKGROUND OF THE INVENTION

Field of the Invention

The present invention relates to an airbag system.

Description of Related Art

In the related art, an airbag device configured to deploy a bag body when an impact is input to a vehicle is known.

Such an airbag device protects the body of an occupant by receiving a part of the body of the occupant using the inflated and deployed bag body. For this reason, there is a need to receive the body of the occupant displaced by the impact using the bag body. However, the body of the occupant may not be sufficiently received by the bag body for various reasons.

For example, Japanese Unexamined Patent Application, First Publication No. 2004-291785, discloses a configuration in which an airbag which is deployed by being inflated between a body-side section of a vehicle and an occupant who is sitting on a seat is provided. In the configuration, when a lumbar region of an occupant is biased toward a side door, the airbag is deployed by being inflated between the body-side section and the lumbar region of the occupant by pushing up the buttocks of the occupant at the side of the body-side section. In the configuration, the deployment of the airbag is not hindered by the body of the occupant, and the airbag is capable to be reliably deployed in order to receive the body of the occupant.

SUMMARY OF THE INVENTION

Incidentally, an airbag device may have a bag body installed in a steering wheel provided in front of a driver's seat or a console in front of a front passenger seat. Such an airbag device receives an upper body of an occupant using the bag body deployed from the steering wheel or the console and inflated upon collision of the vehicle.

However, when a collision direction of the vehicle is inclined in a leftward/rightward direction with respect to a forward/rearward direction, the body of the occupant may be displaced in a direction deviated from the bag body in front.

Also even in this case, it is desired to receive the body of the occupant using the bag body provided in front and minimize an impact applied to the occupant.

An aspect of the present invention is directed to providing an airbag system capable of sufficiently receiving the body of an occupant with respect to impacts input from various directions.

(1) An airbag system according to an aspect of the present invention includes a first airbag device that is provided in front of an occupant who is sitting on a vehicle seat, and that includes a first bag body which is configured to be deployed by being inflated by a gas being supplied during input of an impact; a second airbag device that is provided in the vehicle seat and that includes a second bag body which is configured to be deployed by being inflated toward at least sides and a front of a torso of the occupant who is sitting on the vehicle seat at behind the first bag body by a gas being supplied during input of an impact and which is configured to restrict the occupant to the vehicle seat; and a seat displacement mechanism that is configured to release restriction by a restricting section that restricts movement of the vehicle seat and that is configured to displace the occupant who is sitting on the vehicle seat toward the first bag body in a case the input impact is equal to or larger than a predetermined strength.

(2) In the aspect of the above-mentioned (1), the vehicle seat may include a seat cushion configured to support buttocks of the occupant; a seat back that stands upward from a rear end portion of the seat cushion and that is configured to support the torso of the occupant; a hinge section configured to pivotably connect a rear end portion of the seat cushion and a lower end portion of the seat back about an axis extending in a leftward/rightward direction; and a lock section configured to restrict an inclination angle of the seat back with respect to the seat cushion, and wherein the seat displacement mechanism may be configured to release the restriction of the inclination angle of the seat back by the lock section and to tilt the seat back forward about the axis using the hinge section in a case the input impact is equal to or larger than the predetermined strength.

(3) In the aspect of the above-mentioned (1), the airbag system may include a front fixing member configured to fix a front section of the vehicle seat to a vehicle body; and a rear fixing member that is configured to fix a rear section of the vehicle seat to the vehicle body and that has a smaller restricting force in an upward/downward direction than that of the front fixing member, and wherein the seat displacement mechanism may be configured to release the restriction by the rear fixing member and to displace the rear section of the vehicle seat upward with respect to the front section of the vehicle seat in a case the input impact is equal to or larger than the predetermined strength.

(4) In the aspect of any one of the above-mentioned (1) to (3), the second bag body may include a pair of forward extension sections extending forward from both sides of the seat back of the vehicle seat in a widthwise direction; and a front bag that is provided to be continuous with the forward extension section, that is configured to be deployed in front of the occupant who is sitting on the vehicle seat, and that is configured to abut an upper section of the torso of the occupant.

(5) In the aspect of the above-mentioned (4), the pair of forward extension sections may include a pair of side bags that is configured to be deployed toward both sides of the torso of the occupant in the widthwise direction, respectively, and that is connected to the front bag while abutting side surfaces of the torso; and a pair of upper bags that is configured to be deployed above the torso of the occupant and to abut the upper surface of the shoulder of the occupant.

According to the aspect of the above-mentioned (1), since the second bag body is deployed by being inflated toward at least the sides and the front of the torso of the occupant, the occupant is restricted to the vehicle seat. In this state, when the input impact is equal to or larger than the predetermined strength, since restriction of the vehicle seat is released in the seat displacement mechanism and the occupant who is sitting on the vehicle seat is displaced toward the first bag body in front, the occupant can be reliably guided toward the first bag body. Accordingly, the body of the occupant can be reliably received by the first bag body of the first airbag device with respect to the impact input from various directions.

According to the aspect of the above-mentioned (2), when the input impact is equal to or larger than the predetermined strength, restriction of the inclination angle of the seat back by the lock mechanism is released, and the seat back is tilted forward about the axis by the hinge mechanism. Accordingly, the upper body of the occupant sitting on the seat can be reliably guided toward the first bag body provided in front.

According to the aspect of the above-mentioned (3), the seat displacement mechanism releases restriction of the seat rear section by the rear fixing member and displaces the rear section of the vehicle seat upward with respect to the front section of the vehicle seat in a case the input impact is equal to or larger than the predetermined strength. Accordingly, the upper body of the occupant sitting on the seat can be reliably guided to the first bag body provided in front.

According to the aspect of the above-mentioned (4), the front bag provided to be continuous with the pair of forward extension sections extending toward the front of the vehicle from both sides of the seat back in the widthwise direction is deployed toward the front of the vehicle in front of the occupant who is sitting on the vehicle seat. Accordingly, a forward moving amount of the torso of the occupant can be minimized In addition, the front bag abuts the upper section of the front surface of the torso of the occupant. The upper section of the torso of the occupant, for example, the collarbones or a portion including several rib bones from the uppermost rib bone has a higher resistance with respect to the load applied from the front compared to the portion therebelow. The front bag abuts the upper section of the front surface of the torso having a high resistance with respect to the load in this way, and, with respect to the lower section of the front surface of the torso having a low resistance to the load, the front lower bag section weakly abuts or the front bag does not abut at 11. Accordingly, even when the torso of the occupant is displaced so as to be swung forward to collide with the bag body during collision, the impact received by the occupant can be attenuated.

According to the aspect of the above-mentioned (5), since the forward extension sections include the side bags and the upper bags, the forward extension sections cover the upper sections of the side portions of the torso and the shoulders of the occupant. Accordingly, the torso of the occupant displaced so as to be swung forward by the seat displacement mechanism can be more reliably restricted to the vehicle seat. In addition, the impact received by the occupant upon collision with the first bag body can be attenuated.

DETAILED DESCRIPTION OF THE INVENTION

Hereinafter, embodiments of the present invention will be described with reference to the accompanying drawings. Further, in the drawings used in the following description, an arrow FR indicates a forward direction with respect to a vehicle, an arrow UP indicates an upward direction with respect to the vehicle, and an arrow LH indicates a leftward direction with respect to the vehicle.

First Embodiment

Figure 1:
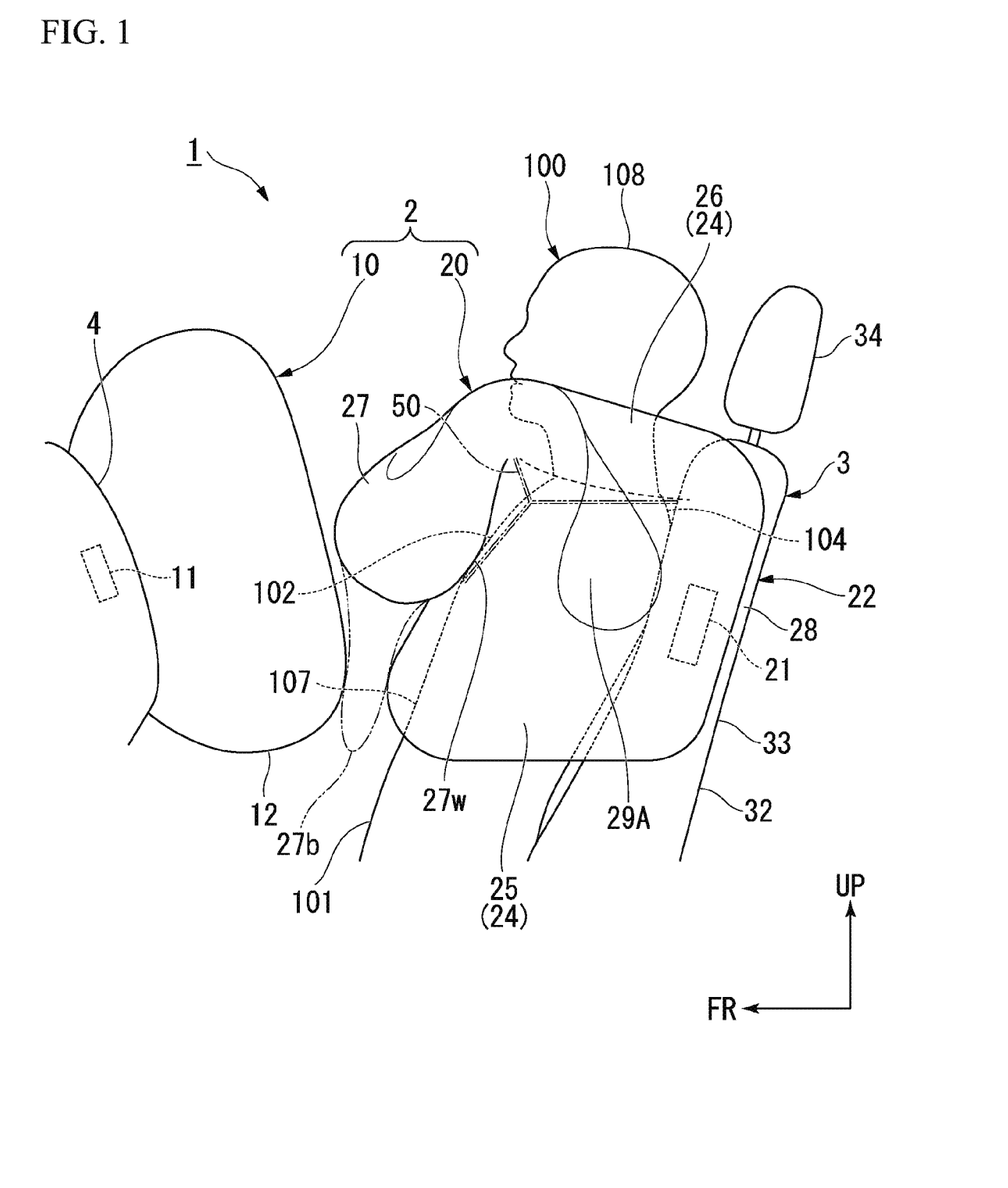
FIG. 1 is a side view showing a part of a vehicle in which an airbag system according to a first embodiment of the present invention is mounted.

FIG. 1 is a side view showing a part of a vehicle in which an airbag system to which an embodiment of the present invention is applied is mounted.

As shown in FIG. 1, the vehicle 1 includes an airbag system 2 in a passenger compartment. The airbag system 2 includes a main airbag device (a first airbag device) 10 provided in a steering wheel or a console 4, a seat airbag device (a second airbag device) 20 provided in a vehicle seat 3, and a seat displacement mechanism 70A.

The steering wheel and the console 4 are provided at a front side of the vehicle 1 (in the front of the vehicle) with respect to the vehicle seat 3. The main airbag device 10 includes an inflator 11 and a first bag body 12.

The inflator 11 generates a high pressure gas in a case an impact to the vehicle is input. The inflator 11 is installed in the steering wheel or the console 4.

The first bag body 12 is accommodated in the steering wheel or the console 4, for example, in a folded or wound state, and is deployed by being inflated toward a rear side of the vehicle (the back of vehicle) from the steering wheel or the console 4 by receiving supply of a gas from the inflator 11.

Figure 2:
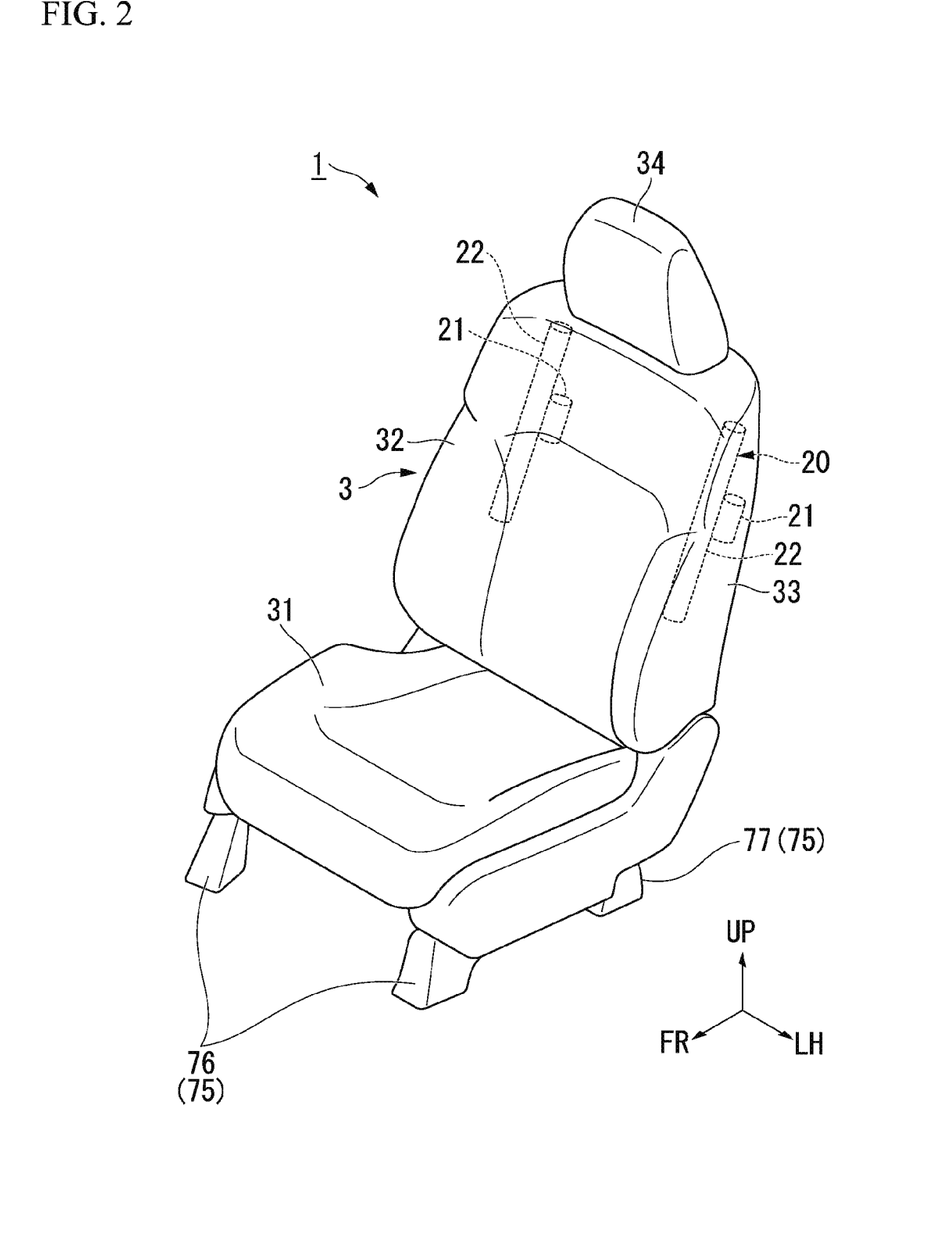
FIG. 2 is a perspective view showing the vehicle seat including a second airbag device of the airbag system.
Figure 3:
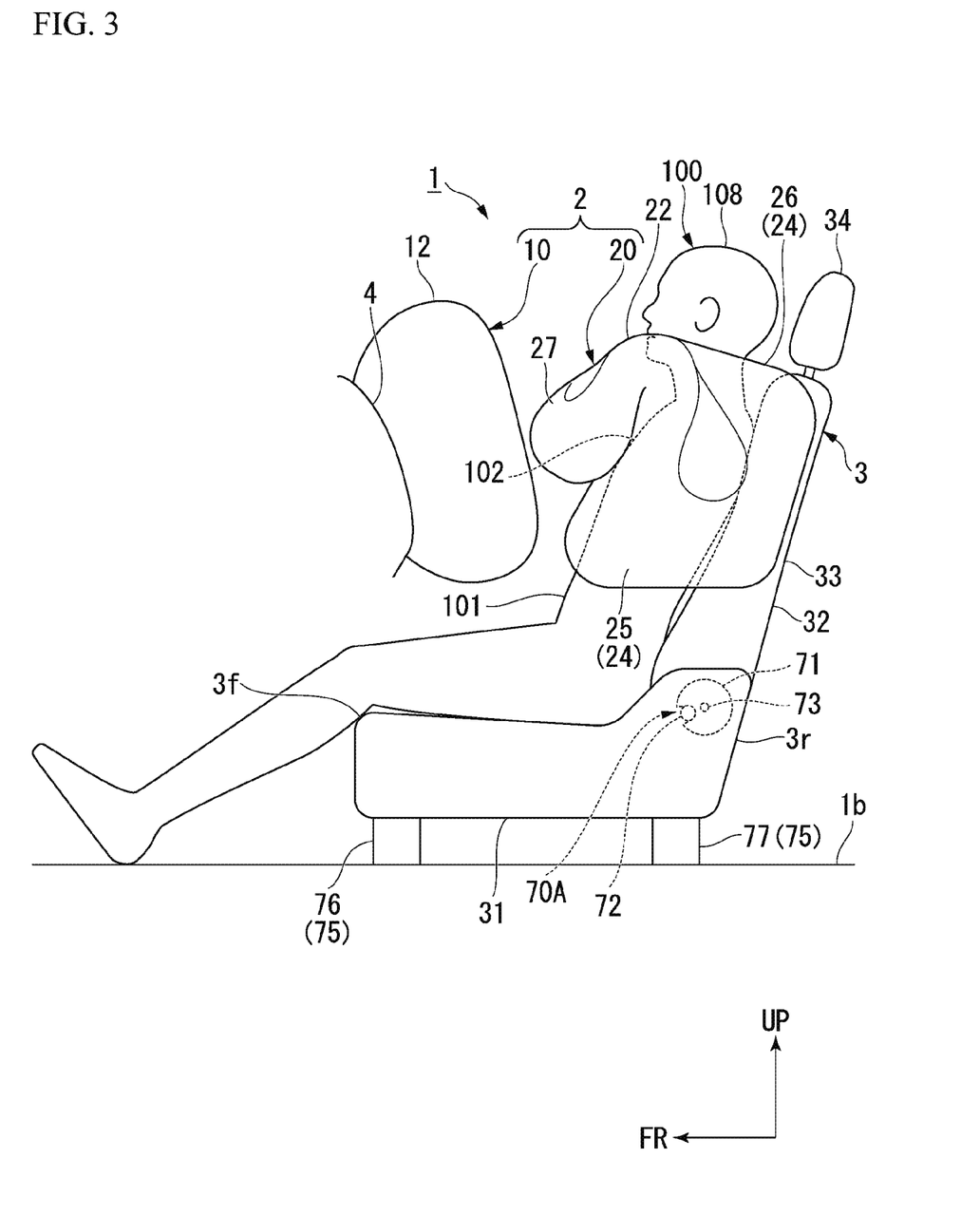
FIG. 3 is a side view showing the vehicle seat.

FIG. 2 is a perspective view showing a vehicle seat including a second airbag device of the airbag system. FIG. 3 is a side view showing the vehicle seat.

As shown in FIG. 2 and FIG. 3, the vehicle seat 3 in which the seat airbag device 20 is mounted is, for example, a driver's seat, a front passenger seat, or the like. The vehicle seat 3 includes a seat cushion 31 configured to support the buttocks of the occupant, and a seat back 32 connected to a rear end portion of the seat cushion 31 and configured to support the upper body (the torso, the neck and the head) of the occupant.

The seat cushion 31 includes a frame that forms a skeleton of the seat cushion 31, a pad member formed of, for example, urethane foam or the like and mounted on the frame, and a cover formed of, for example, synthetic fibers, leather, or the like, and configured to cover the frame and the pad member (none of which is shown).

The seat cushion 31 and the vehicle seat 3 are fixed to a floor surface of a vehicle body 1b of the vehicle 1 by a fixing section (a restricting section) 75. In the embodiment, the seat cushion 31 includes, as the fixing section 75, for example, a pair of left and right front fixing members 76 configured to fix a front section 3f of the vehicle seat 3 to the vehicle body 1b, and a pair of left and right rear fixing members 77 configured to fix a rear section 3r of the vehicle seat 3 to the vehicle body 1b.

The seat back 32 includes a seat back main body 33 standing upward from a rear end portion of the seat cushion 31 and configured to support, for example, the lumbar region and the back of the occupant, and a headrest 34 attached to an upper end portion of the seat back main body 33 and configured to support, for example, the head of the occupant. Like the seat cushion 31, the seat back 32 is constituted by a frame, a pad member and a cover. Further, the seat back main body 33 and the headrest 34 may be formed integrally with each other.

As shown in FIG. 3, the seat back 32 is tiltably connected to a rear end portion of the seat cushion 31 by a hinge section 71. The hinge section 71 has a shaft 73 extending in a leftward/rightward direction, and the seat back 32 is tiltable with respect to the seat cushion 31 in the forward/rearward direction by pivoting the seat back 32 around the shaft 73. In addition, an inclination angle of the seat back 32 that is tiltable by the hinge section 71 can be restricted by a lock section (a restricting section) 72 including a pin or the like. An occupant 100 can release the restriction by the lock section 72 and can tilt the seat back 32 by operating an operating arm (not shown) or the like of the lock section 72.

Further, specific configurations of the hinge section 71 and the lock section 72 may be anything as long as the required functions can be realized.

As shown in FIG. 2, the seat airbag device 20 is installed in the seat back 32. In the embodiment, the seat airbag device 20 is installed in the seat back main body 33. The seat airbag device 20 restricts an upper section of an upper body of an occupant during an operation. The seat airbag device 20 includes an inflator 21 and a pair of second bag bodies 22.

The inflator 21 generates a high pressure gas when an impact to the vehicle is input. The inflator 21 is attached to a frame that forms the seat back 32.

Figure 4:
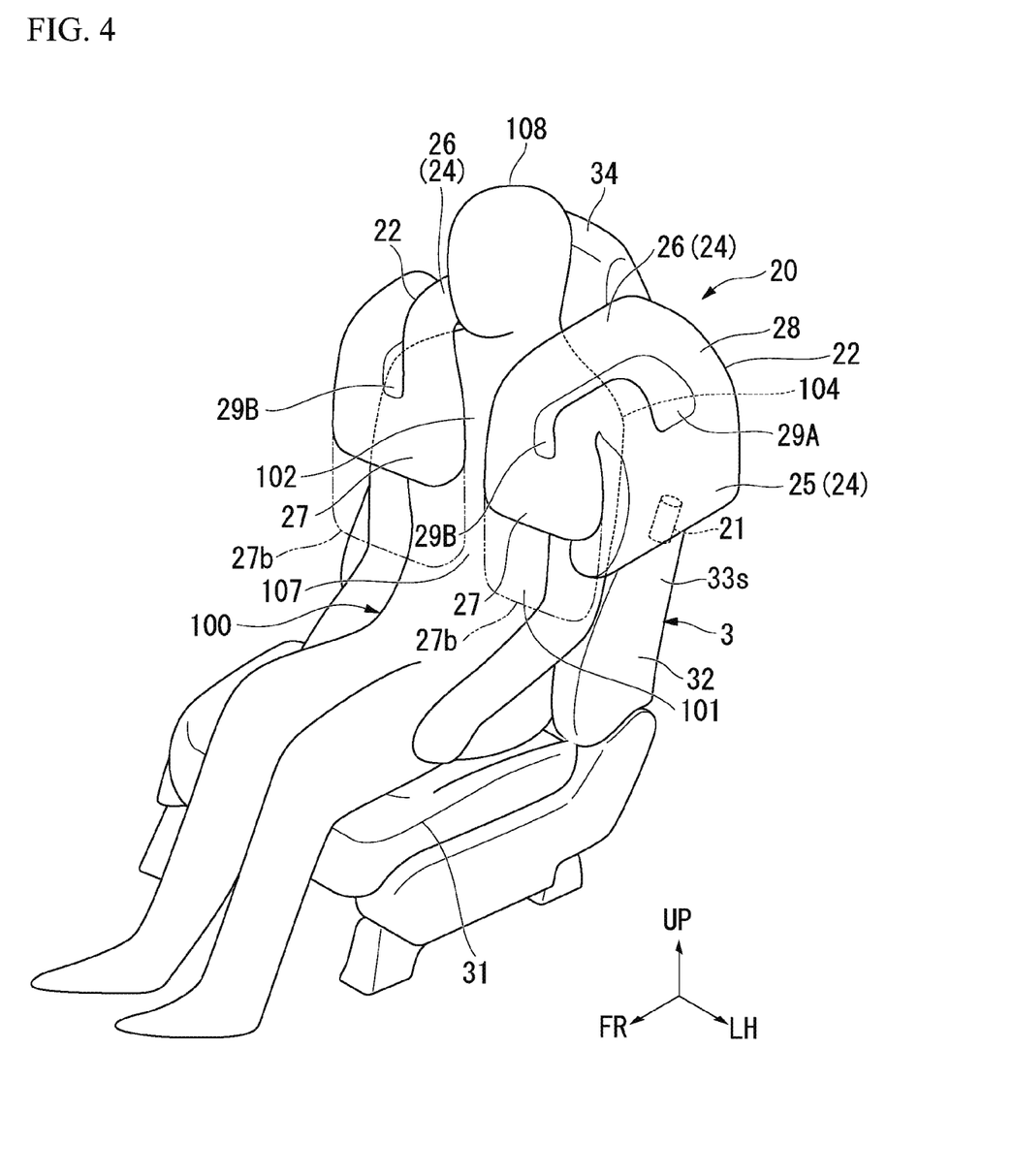
FIG. 4 is a view showing a state in which the second airbag device is deployed, and a perspective view of a vehicle seat in which the second airbag device is mounted.
Figure 5:
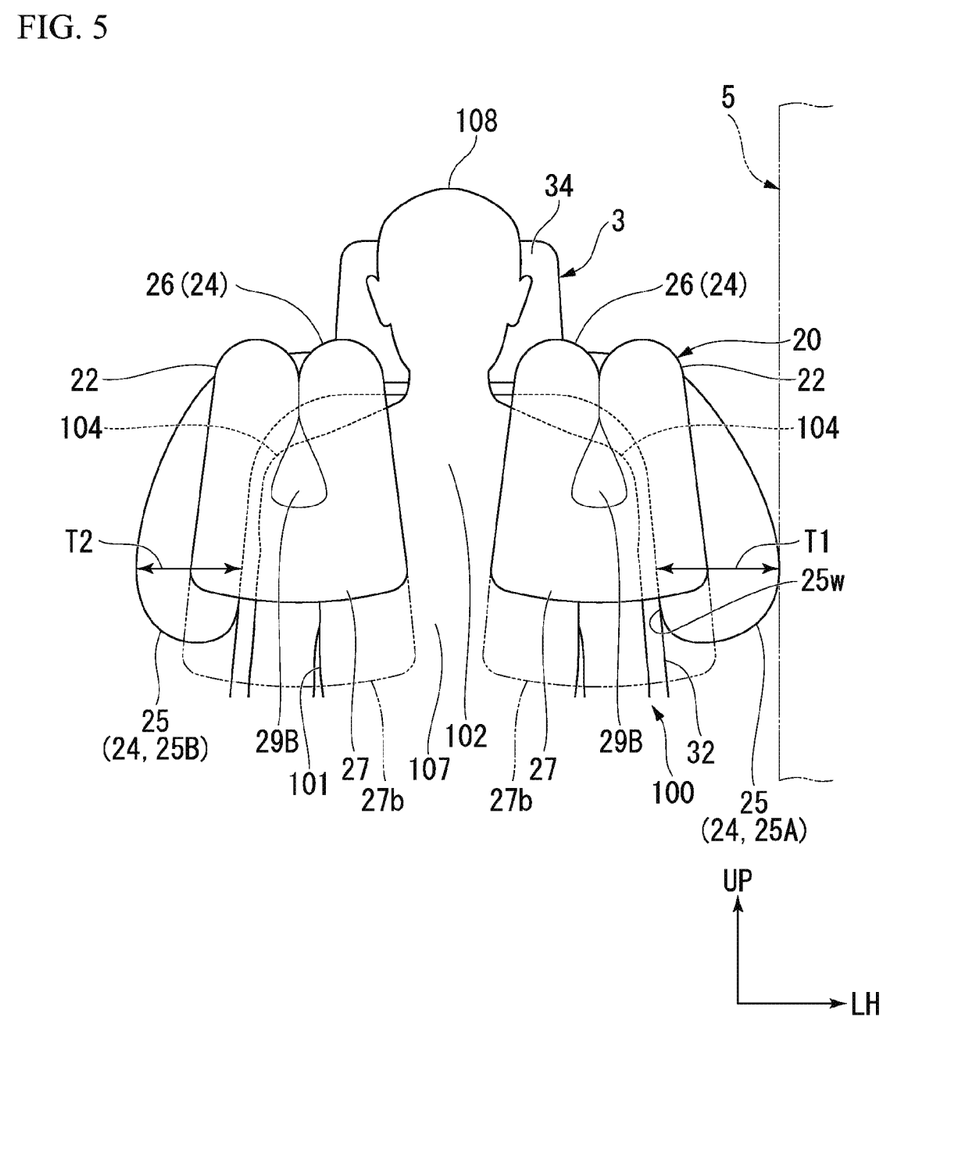
FIG. 5 is a view showing a state in which the second airbag device is deployed, and a view showing the vehicle seat in which the second airbag device is mounted from in front of the vehicle.

FIG. 4 is a view showing a state in which the second airbag device is deployed, and a perspective view of the vehicle seat in which the second airbag device is mounted. FIG. 5 is a view showing a state in which the second airbag device is deployed, and a view of the vehicle seat in which the second airbag device is mounted from in front of the vehicle.

As shown in FIG. 1, FIG. 4 and FIG. 5, the pair of second bag bodies 22 are accommodated in the seat back 32, for example, in a folded or wound state, and are deployed by being inflated from the seat back 32 by receiving supply of a gas from the inflator 21. The pair of second bag bodies 22 are attached to the frame that forms the seat back 32. Each of the second bag bodies 22 is formed in a bag shape by one base fabric, or a plurality of sheets of base fabrics that are sewn to each other. In the following description related to the second bag bodies 22, a state in which deployment of the second bag bodies 22 is completed (a state shown in FIG. 1, FIG. 4 and FIG. 5) will be described unless the context clearly indicates otherwise.

The pair of second bag bodies 22 are disposed to extend to the front of the torso of the occupant from both sides of the seat back main body 33, respectively. The second bag bodies 22 are deployed by breaking seams or the like of the cover from side surfaces 33s of the seat back main body 33. The pair of second bag bodies 22 are deployed by being inflated in a region including a front side of the torso 101 of the occupant 100.

Each of the pair of second bag bodies 22 includes a forward extension section 24 and a front bag 27.

The forward extension sections 24 extend toward the front of the vehicle 1 from the sides of the seat back 32 in the widthwise direction. In the embodiment, each of the forward extension sections 24 includes a side bag 25 and an upper bag 26.

The side bags 25 extend forward from the sides of the seat back 32 in the widthwise direction while passing the sides (side surfaces) of the torso 101 of the occupant 100. The side bags 25 are deployed in a tubular shape extending in the forward/rearward direction, and cover upper sections of shoulders 104 and arms of the occupant 100 from sides thereof.

The upper bags 26 are provided via articulated sections 28 which is continuous with rear end portions of the side bags 25 and extending upward. The upper bags 26 extend forward from the articulated sections 28, and are deployed to cover upper surfaces of the shoulders 104 above the torso 101 of the occupant 100.

Here, as shown in FIG. 5, in the pair of second bag bodies 22, a thickness T1 of a side bag 25A provided on a side of a door 5 of the vehicle 1 in the leftward/rightward direction (the widthwise direction of the vehicle 1) is larger than a thickness T2 of a side bag 25B on a side opposite to the side of the door 5.

As shown in FIG. 1, FIG. 4 and FIG. 5, the front bags 27 are provided to be continuous with the forward extension sections 24. In the embodiment, the front bags 27 are provided to be continuous with front end portions of the side bags 25 and front end portions of the upper bags 26. The front bags 27 are deployed in front of the occupant 100 who is sitting on the vehicle seat 3, and abut only an upper section 102 of a front surface of the torso 101 of the occupant 100. Specifically, the front bags 27 are provided to abut collarbones and a plurality of upper rib bones of the torso 101 (for example, the two uppermost rib bones). Lower sections of the front bags 27 end at a height of, for example, the second rib bone from the uppermost rib bone, and do not abut an area below the third rib bone from the uppermost rib bone (a lower section 107 of a front surface of the torso 101). Accordingly, a relative strength of an occupant restricting force is given by the front bags 27 in the upward/downward direction.

As shown by two-dot chain lines in FIG. 1, FIG. 4 and FIG. 5, the front bags 27 may include front lower bags 27b that abut with respect to an area below the third rib bone (the lower section 107) from the uppermost rib bone with a smaller abutting force than the upper section 102. The front lower bag 27b are provided with, for example, holes, notches, fragile sections, and the like, to have weak abutting forces. Accordingly, a relative strength of an occupant restricting force is given by the front bags 27 in the upward/downward direction.

As shown in FIG. 1, the front bags 27 are provided to be deployed by being inflated between the first bag body 12 provided in the steering wheel or the console 4 and the torso 101 of the occupant 100.

Belt-like tethers 50 are provided in the second bag bodies 22 such that the side bags 25, the upper bags 26 and the front bags 27 are deployed along the upper section 102 of the front surface of the torso 101 of the occupant 100 and the upper sections of the side surfaces of the torso 101.

Non-inflation sections 29A and 29B obtained by sewing the base fabrics facing the bag bodies of each other and configured not to be inflated during deployment are formed on the side bags 25 and the front bags 27. The side bags 25 are inflated while forming curved surfaces 25w (see FIG. 5) abutting upper sections of the arms of the occupant 100 by forming the non-inflation sections 29A. The front bags 27 are inflated while forming curved surfaces 27w (see FIG. 1) abutting the upper section 102 of the front surface of the torso 101 due to the formation of the non-inflation sections 29B.

In addition, the second bag bodies 22 have the side bags 25, the upper bags 26 and the front bags 27 that are continuously provided at outer circumferential sides of the non-inflation sections 29A and 29B.

The inflator 21 supplies a gas into the second bag bodies 22 in the vicinity of the rear end portions of the side bags 25. The pair of second bag bodies 22 are deployed by being inflated in sequence of the side bags 25, the upper bags 26 and the front bags 27 when the gas is supplied from the inflator 21.

Figure 6:
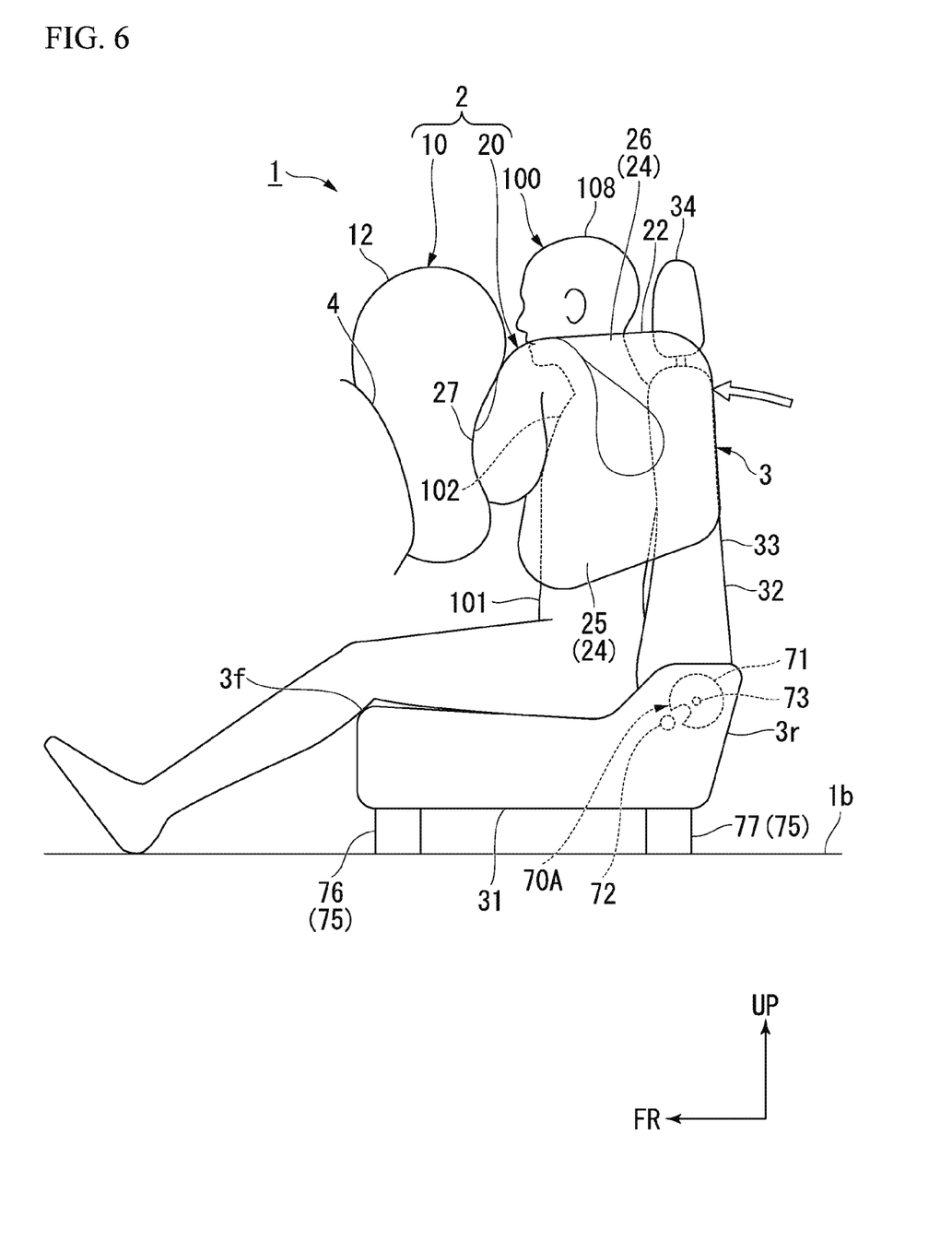
FIG. 6 is a side view showing a state in which the vehicle seat is displaced by a seat displacement mechanism of the airbag system.

FIG. 6 is a side view showing a state in which the vehicle seat is displaced by the seat displacement mechanism of the airbag system.

As shown in FIG. 6, the seat displacement mechanism 70A displaces the occupant 100 who is sitting on the vehicle seat 3 toward the first bag body 12 in front by displacing a part (the seat back 32) of the vehicle seat 3 when the input impact is equal to or larger than a predetermined strength. In the embodiment, the seat displacement mechanism 70A includes the lock section 72 that restricts an inclination angle of the seat back 32.

The seat displacement mechanism 70A releases restriction of the inclination angle of the seat back 32 by the lock section 72 by breaking a pin of the lock section 72, or the like, when the input impact is equal to or larger than a predetermined strength. Here, the hinge section 71 has a strength that maintains a function of tilting the seat back 32 in the forward/rearward direction even when a direction of the input impact is inclined in the leftward/rightward direction with respect to the forward/rearward direction.

Hereinafter, an operation of the airbag system 2 will be described.

When an impact is input to the vehicle 1, the inflator 11 of the main airbag device 10 and the inflators 21 of the seat airbag device 20 generate high pressure gases. When the gas is generated from the inflator 11, the first bag body 12 of the main airbag device 10 is deployed by being inflated by receiving supply of the gas. When the gases are generated from the inflators 21, the second bag bodies 22 of the seat airbag device 20 are deployed by being inflated by receiving supply of the gas.

When the second bag bodies 22 are deployed by being inflated, when the gases are generated from the inflators 21, the side bags 25 are first deployed by being inflated by receiving supply of the gas. When the side bags 25 are deployed to a certain extent by being inflated, the gas is supplied to the upper bags 26 from the rear end portions of the side bags 25 through the articulated sections 28, and the upper bags 26 are deployed by being inflated.

After that, the gas is supplied to the front bags 27 from the front end portions of the side bags 25 and the front end portions of the upper bags 26. Accordingly, the front bags 27 are deployed by being inflated in front of the upper section 102 of the torso 101 of the occupant 100. A deployment shape of the front bags 27 is a shape that covers the upper section 102 of the torso 101 of the occupant 100 from the front using tension of the tether 50, and holds a restricting force of the body of the occupant 100. The front bags 27 are interposed between the upper section 102 of the torso 101 and the first bag body 12 of the main airbag device 10 deployed by being inflated from the steering wheel or the console 4.

Here, when the impact input to the vehicle 1 is equal to or larger than a predetermined strength, restriction of the inclination angle of the seat back 32 by the lock section 72 is released by breaking the pin of the lock section 72 in the seat displacement mechanism 70A, or the like. Accordingly, the seat back 32 is inclined forward about the shaft 73 by the hinge section 71. Here, the hinge section 71 maintains a function of tilting the seat back 32 in the forward/rearward direction. For this reason, even when a direction of the impact input to the vehicle 1 is inclined in the leftward/rightward direction with respect to the forward/rearward direction, the occupant 100 who is sitting on the vehicle seat 3 is guided toward the first bag body 12 in front by the seat displacement mechanism 70A. Accordingly, the body of the occupant 100 is reliably received by the first bag body 12.

Accordingly, an operation of the airbag system 2 is completed.

As described above, in the embodiment, since the second bag bodies 22 are deployed by being inflated toward at least the sides and the front of the torso 101 of the occupant 100, the occupant 100 is restricted to the vehicle seat 3. In this state, when the input impact is equal to or larger than the predetermined strength, since the restrict of the vehicle seat 3 is released in the seat displacement mechanism 70A and the occupant 100 who is sitting on the vehicle seat 3 is displaced toward the first bag body 12, the occupant 100 can be reliably guided toward the first bag body 12. Accordingly, the body of the occupant 100 can be reliably received by the first bag body 12 with respect to the impact input from various directions.

In addition, when the input impact is equal to or larger than the predetermined strength, since the restriction of the inclination angle of the seat back 32 by the lock section 72 is released, the seat back 32 is tilted forward about the shaft 73 by the hinge section 71. Accordingly, the torso 101 of the occupant 100 sitting on the seat can be reliably guided toward the first bag body 12 provided in front.

In addition, the pair of forward extension sections 24 extending toward the front of the vehicle from both sides of the seat back 32 in the widthwise direction are provided to be continuous with the front bags 27, and the front bags 27 are deployed in front of the occupant 100 who is sitting on the vehicle seat 3.

Accordingly, a moving amount of the torso 101 of the occupant 100 toward the front of the vehicle can be minimized. In addition, the front bags 27 abut the upper section 102 of the front surface of the torso 101 of the occupant 100. The upper section 102 of the torso 101 of the occupant 100, for example, the collarbone, or a portion to several rib bones from the uppermost rib bone has a higher resistance with respect to the load applied from the front compared to the portion therebelow. The front bags 27 abut the upper section 102 of the front surface of the torso 101 having a high resistance with respect to the load, and, with respect to the lower section 107 of the front surface of the torso 101 having a low resistance to the load, the front lower bag 27b weakly abuts or the front bags 27 does not abut at all. Accordingly, application of the impact to the lower section 107 below the upper section 102 of the torso 101, which having a low resistance with respect to the load applied from the front, can be minimized. Accordingly, even when the torso 101 of the occupant 100 is displaced so as to be swung forward to collide with the second bag bodies 22 during collision, the impact received by the occupant 100 can be attenuated.

In addition, the forward extension section 24 includes the side bags 25 and the upper bags 26, and thus, covers the upper sections 102 of the side portions and the shoulders 104 of the torso 101 of the occupant 100. Accordingly, the torso 101 of the occupant 100 displaced so as to be swung forward by the seat displacement mechanism 70A can be more reliably restricted to the vehicle seat 3. In addition, the impact received by the occupant 100 when colliding with the first bag body 12 can be attenuated.

Further, in the embodiment, when the impact input to the vehicle 1 is equal to or larger than the predetermined strength, while the restriction of the inclination angle of the seat back 32 by the lock section 72 is released by breaking the pin of the lock section 72 in the seat displacement mechanism 70A, or the like, there is no limitation thereto.

For example, the seat displacement mechanism 70A may be controlled to operate a lock pin of the lock section 72 to release the restriction of the inclination angle of the seat back 32 by the lock section 72 when the impact input to the vehicle 1 is equal to or larger than the predetermined strength. When such control is performed, the restriction of the inclination angle of the seat back 32 by the lock section 72 may be released only in the case in which the impact input to the vehicle 1 is inclined in the leftward/rightward direction with respect to the forward/rearward direction.

Second Embodiment

Next, an airbag system according to a second embodiment of the present invention will be described. Further, the airbag system in the second embodiment described below is distinguished from the airbag system in the first embodiment only in the configuration of the seat displacement mechanism. In the following description, the components common to the first embodiment are designated by the same reference numerals in the drawings, and descriptions thereof will be omitted.

Figure 7:
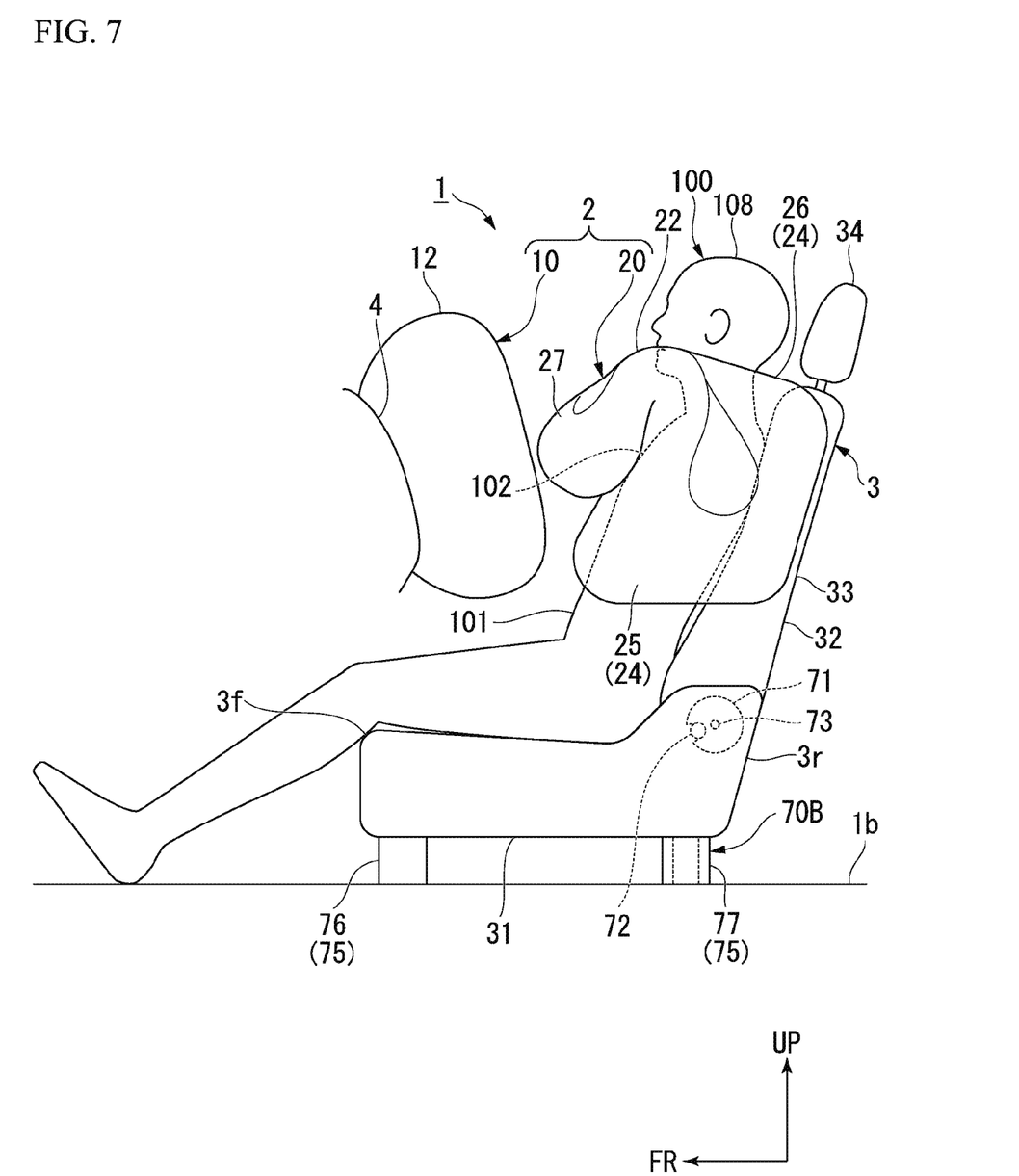
FIG. 7 is a side view showing a vehicle seat including a seat displacement mechanism of an airbag system according to a second embodiment of the present invention.
Figure 8:
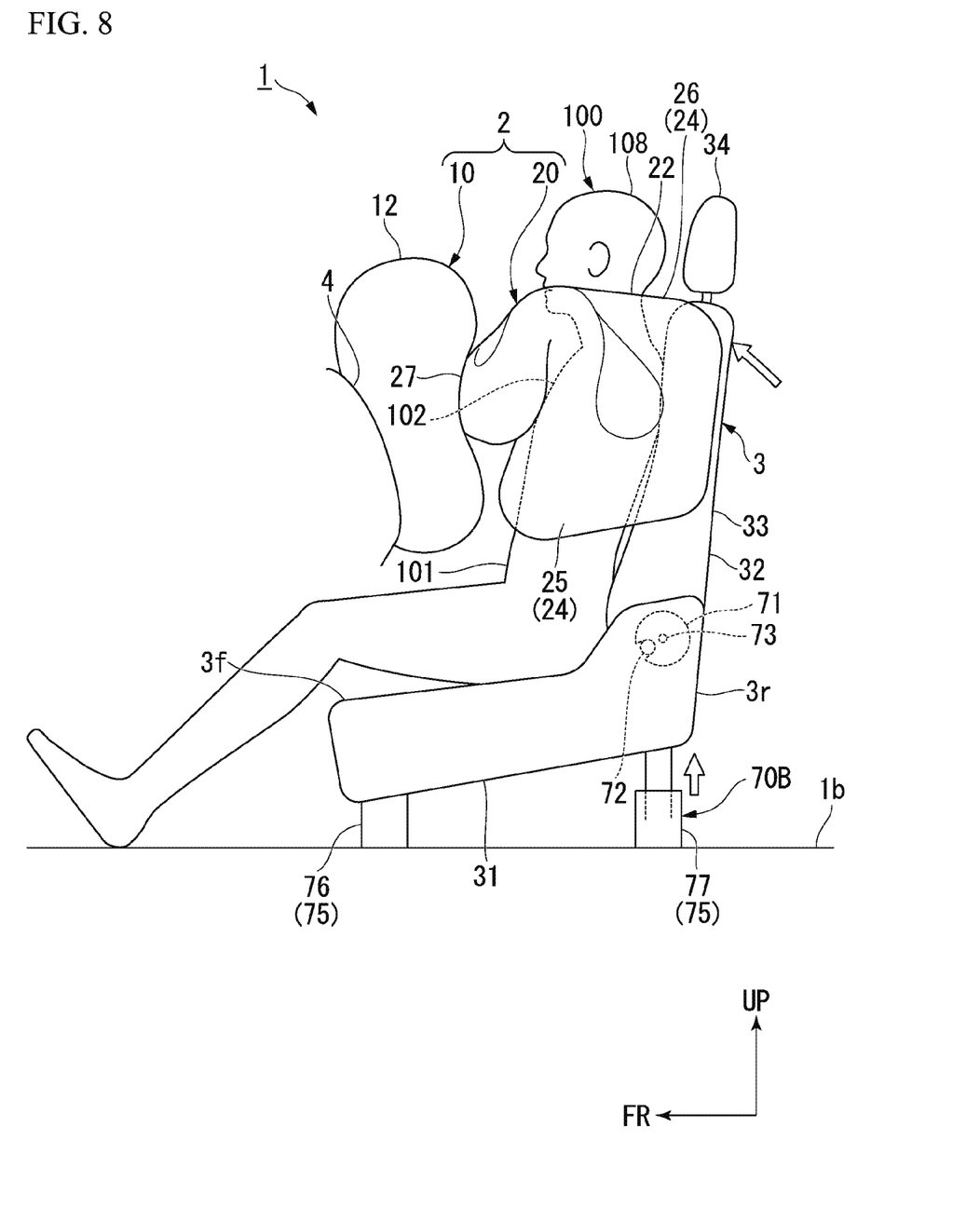
FIG. 8 is a side view showing a state in which the vehicle seat is displaced by the seat displacement mechanism of the second embodiment.

FIG. 7 is a side view showing a vehicle seat including a seat displacement mechanism of the airbag system according to the second embodiment. FIG. 8 is a side view showing a state in which the vehicle seat is displaced by the seat displacement mechanism of the second embodiment.

As shown in FIG. 7, since a seat displacement mechanism 70B of the airbag system 2 in the embodiment releases the restriction by the fixing section 75 that fixes the vehicle seat 3 to a vehicle body 1b of the vehicle 1 when the input impact is equal to or larger than the predetermined strength, the occupant 100 who is sitting on the vehicle seat 3 is displaced toward the first bag body 12 in front. In the embodiment, the seat displacement mechanism 70B includes the rear fixing members 77 of the fixing section 75.

The seat displacement mechanism 70B releases restriction of a rear section 3r of the vehicle seat 3 by the rear fixing members 77 by deforming (for example, expand) the rear fixing members 77 that constitute the fixing section 75 in the upward/downward direction when the input impact is equal to or larger than the predetermined strength.

The rear fixing members 77 have a restricting force in the upward/downward direction that is set to be lower than that of the front fixing members 76. Accordingly, as shown in FIG. 8, when the input impact is equal to or larger than the predetermined strength, the rear fixing members 77 are deformed to extend, for example, in the upward/downward direction. The rear fixing members 77 may be broken after extending in the upward/downward direction. Then, the seat cushion 31 and the seat back 32 of the vehicle seat 3 pivot about the front fixing members 76, and the rear section 3r is displaced to rise upward with respect to the front section 3f of the vehicle seat 3. Accordingly, the occupant 100 who is sitting on the vehicle seat 3 is guided toward the first bag body 12 provided in front.

Here, since the rear section 3r is easily displaced upward with respect to the front section 3f of the vehicle seat 3, a hinge mechanism or the like configured to pivotably support the front section 3f of the vehicle seat 3 about an axis in the leftward/rightward direction may be provided on the front fixing members 76.

As described above, in the second embodiment, when the input impact is equal to or larger than the predetermined strength, since the restriction of the vehicle seat 3 in the seat displacement mechanism 70B is released and the occupant 100 who is sitting on the vehicle seat 3 is displaced toward the first bag body 12, the occupant 100 can be reliably guided toward the first bag body 12. Accordingly, the body of the occupant 100 can be reliably received by the first bag body 12 of the airbag device with respect to the impact input in various directions.

In addition, the seat displacement mechanism 70B releases restrict of the seat rear section by the rear fixing members 77 and displaces the rear section 3r upward with respect to the front section 3f of the vehicle seat 3 when the input impact is equal to or larger than the predetermined strength. Accordingly, the torso 101 of the occupant 100 sitting on the seat can be reliably guided toward the first bag body 12 provided in front. Accordingly, the body of the occupant 100 can be reliably received by the first bag body 12 of the airbag device with respect to the impact input from various directions.

In addition, in the second embodiment, in the seat displacement mechanism 70B, while the rear fixing members 77 is deformed in the upward/downward direction when the input impact is equal to or larger than the predetermined strength, there is no limitation thereto.

Figure 9:
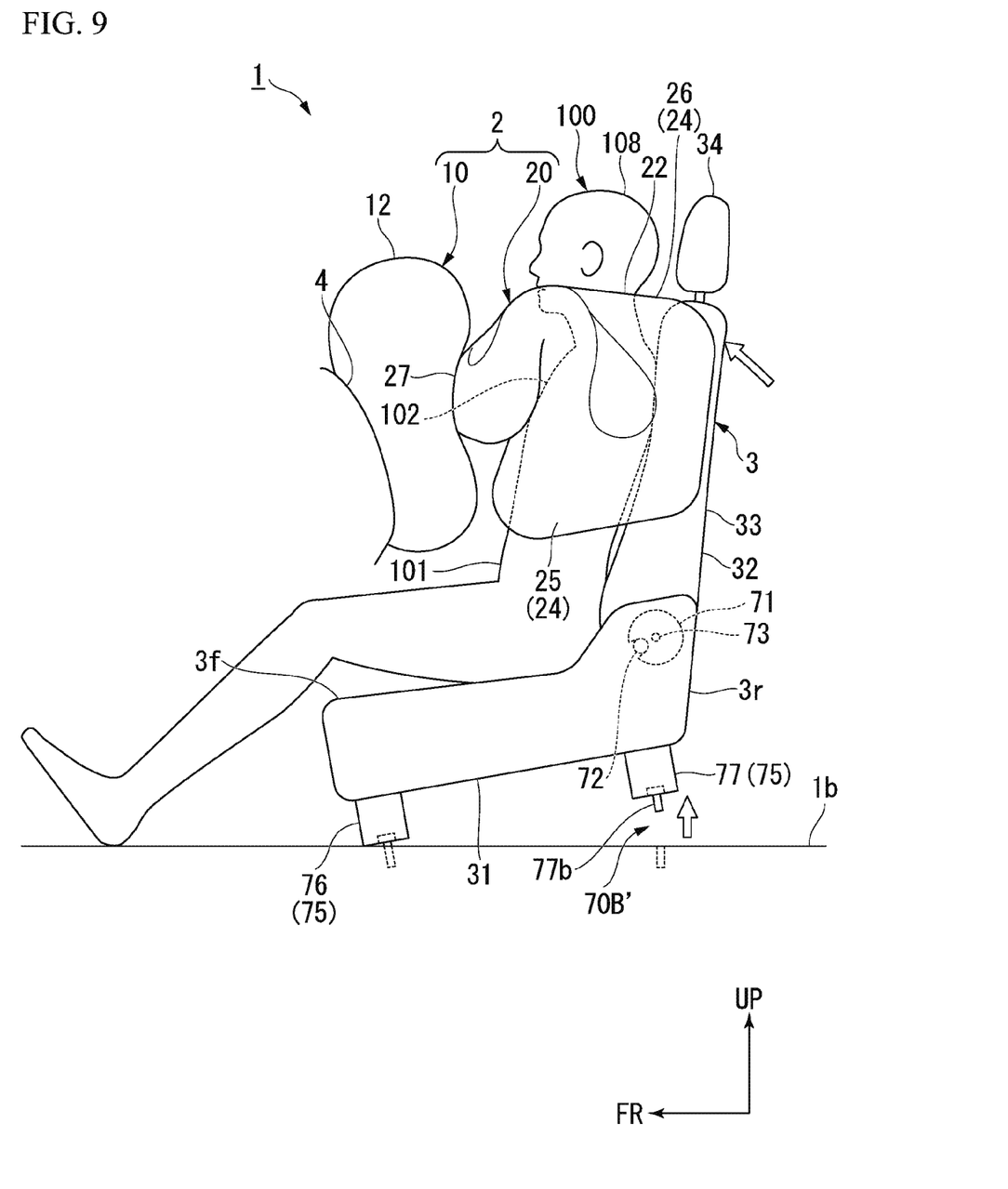
FIG. 9 is a side view showing a state in which the vehicle seat is displaced by a seat displacement mechanism of an airbag system according to a variant of the second embodiment.

FIG. 9 is a side view showing a state in which a vehicle seat is displaced by a seat displacement mechanism of an airbag system according to a variant of the second embodiment.

As shown in FIG. 9, a seat displacement mechanism 70B' has a configuration in which bolts 77b configured to fix the rear fixing members 77 to a floor surface of vehicle body 1b is separated, deformed or broken upward when the input impact is equal to or larger than the predetermined strength. Accordingly, like the seat displacement mechanism 70B of the second embodiment, the seat cushion 31 and the seat back 32 of the vehicle seat 3 are pivoted about the front fixing members 76, and displaced such that the rear section 3r rides upward with respect to the front section 3f of the vehicle seat 3. Accordingly, the torso 101 of the occupant 100 who is sitting on the vehicle seat 3 is guided toward the first bag body 12 provided in front. Accordingly, the body of the occupant 100 can be reliably received by the first bag body 12 with respect to the impact input from various directions.

Further, the present invention is not limited to the above-mentioned embodiments described with reference to the drawings, and various variants are considered without departing from the technical scope of the present invention.

For example, in the embodiment, while the seat airbag device 20 includes the side bags 25 and the upper bags 26, which are the forward extension sections 24, only the side bags 25 may be provided.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. An airbag system comprising:
a first airbag device that is provided in front of an occupant who is sitting on a vehicle seat, and that includes a first bag body which is configured to be deployed by being inflated by a gas being supplied during input of an impact;
a second airbag device that is provided in the vehicle seat and that includes a second bag body which is configured to be deployed by being inflated toward at least sides and a front of a torso of the occupant who is sitting on the vehicle seat at behind the first bag body by a gas being supplied during input of an impact and which is configured to restrict the occupant to the vehicle seat; and
a seat displacement mechanism that is configured to release restriction by a restricting section that restricts movement of the vehicle seat and that is configured to displace the occupant who is sitting on the vehicle seat toward the first bag body in a case the input impact is equal to or larger than a predetermined strength.

2. The airbag system according to claim 1, wherein the vehicle seat comprises:
a seat cushion configured to support buttocks of the occupant;
a seat back that stands upward from a rear end portion of the seat cushion and that is configured to support the torso of the occupant;
a hinge section configured to pivotably connect a rear end portion of the seat cushion and a lower end portion of the seat back about an axis extending in a leftward/rightward direction; and
a lock section configured to restrict an inclination angle of the seat back with respect to the seat cushion, and
wherein the seat displacement mechanism is configured to release the restriction of the inclination angle of the seat back by the lock section and to tilt the seat back forward about the axis using the hinge section in a case the input impact is equal to or larger than the predetermined strength.

3. The airbag system according to claim 1, comprising:
a front fixing member configured to fix a front section of the vehicle seat to a vehicle body; and
a rear fixing member that is configured to fix a rear section of the vehicle seat to the vehicle body and that has a smaller restricting force in an upward/downward direction than that of the front fixing member, and
wherein the seat displacement mechanism is configured to release the restriction by the rear fixing member and to displace the rear section of the vehicle seat upward with respect to the front section of the vehicle seat in a case the input impact is equal to or larger than the predetermined strength.

4. The airbag system according to claim 1, wherein the second bag body comprises:
a pair of forward extension sections extending forward from both sides of the seat back of the vehicle seat in a widthwise direction; and
a front bag that is provided to be continuous with the forward extension section, that is configured to be deployed in front of the occupant who is sitting on the vehicle seat, and that is configured to abut an upper section of the torso of the occupant.

5. The airbag system according to claim 4, wherein the pair of forward extension sections comprise:
a pair of side bags that is configured to be deployed toward both sides of the torso of the occupant in the widthwise direction, respectively, and that is connected to the front bag while abutting side surfaces of the torso; and
a pair of upper bags that is configured to be deployed above the torso of the occupant and to abut the upper surface of the shoulder of the occupant.

* * * * *